No. 825,241. PATENTED JULY 3, 1906.
G. PINO.
APPARATUS FOR VIEWING AND PHOTOGRAPHING THE SEA BOTTOM FROM THE SURFACE.
APPLICATION FILED AUG. 30, 1902.
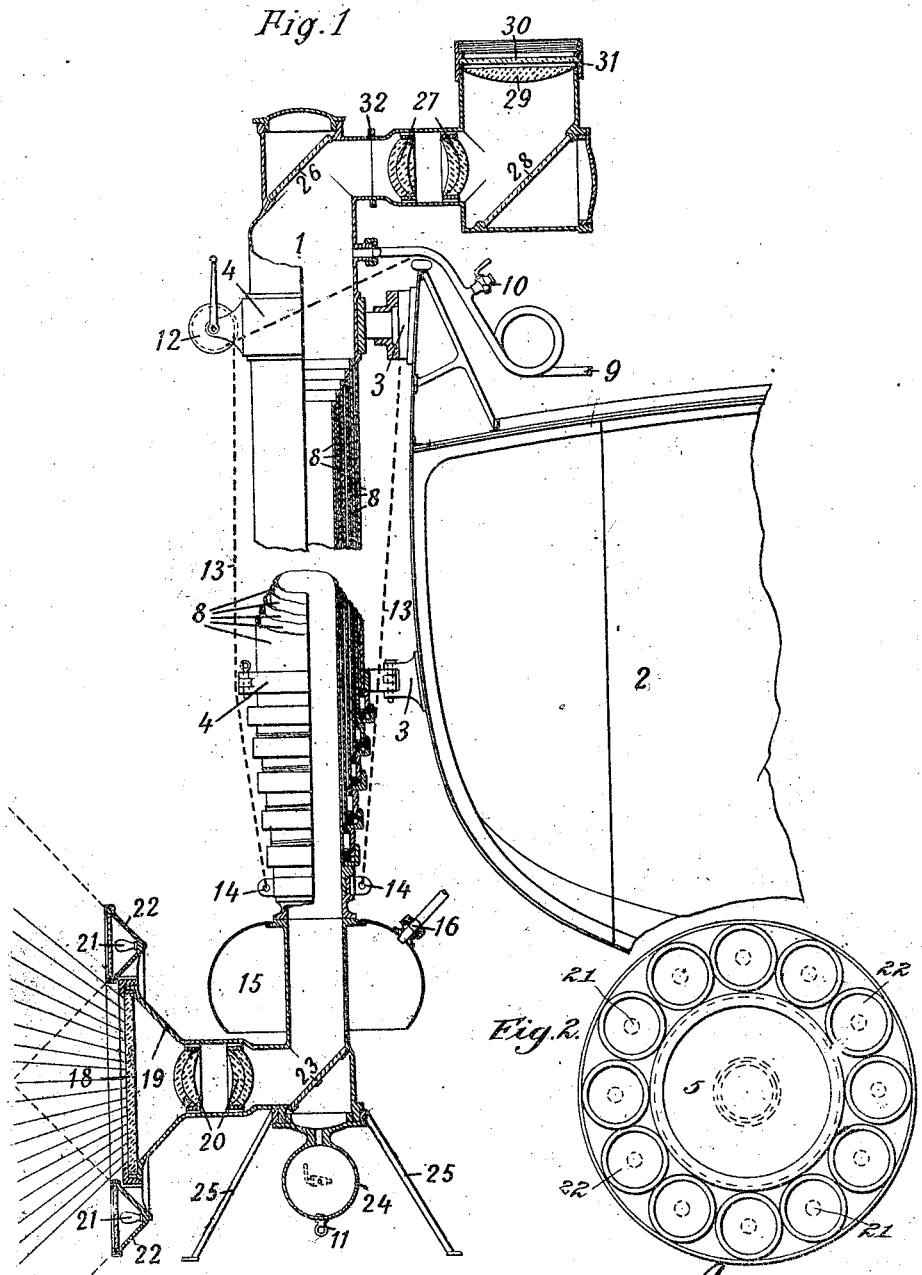

UNITED STATES PATENT OFFICE.

GIUSEPPE PINO, OF GENOA, ITALY.

APPARATUS FOR VIEWING AND PHOTOGRAPHING THE SEA-BOTTOM FROM THE SURFACE.

No. 825,241.     Specification of Letters Patent.     Patented July 3, 1906.

Application filed August 30, 1902. Serial No. 121,694.

*To all whom it may concern:*

Be it known that I, GIUSEPPE PINO, a subject of the King of Italy, and a resident of Genoa, Italy, have invented certain new and useful Improvements in Apparatus for Viewing and Photographing the Sea-Bottom from the Surface, (for which I have obtained Letters Patent of the Kingdom of Italy on February 3, 1902,) of which the following is a specification.

This invention relates to a submarine telescope by means of which the bottom of the sea or of any other piece of water may be explored and photographed from the surface.

My invention also consists in the novel devices and novel combination of parts and devices herein shown and described, and more particularly pointed out in the claims.

In the accompanying drawings, which form a part of this specification, and in which similar letters of reference indicate like parts, Figure 1 is a vertical view, partly in section, of the apparatus fixed on the side of a vessel or of a buoy 2 by means of a support 3 and rings 4. Fig. 2 is a plan view of the reflector 19 with the electric incandescent lamps arranged as a crown.

In carrying the invention into practice the submarine telescope is formed of a tube 1, consisting of a number of water-tight elements 8, sliding one within the other, and consequently adapted to be lengthened or shortened, as required, the displacement being effected by means of compressed air which is forced into it through a pipe 9 in communication with a compressor, the exhaust taking place through a suitable cock 10. The appliance may also be lengthened by applying weights to the lower extremity of the central tube or at the bottom of the spherical vessel 24, which is provided with a ring or hook 11 for this purpose, after which it may be caused to occupy its normal position of repose by means of a winch 12 and cables or chains 13, attached to rings 14, fixed to the extremity of the central tube. It may also be telescoped by injecting into the bell 15 compressed air or gas having a pressure greater than that of the column of water by means of the cock 16, one or more flexible tubes connected to the joint being employed for that purpose.

The tube contains the lenses and mirrors necessary for its operation, and the central tube is adapted to receive the various objectives with reflector corresponding to the kind of horizontal or vertical exploration to be effected according to circumstances. These objectives may be of widely-different forms and may, for example, consist of, first, a disk of crystal 18 of suitable thickness for resisting pressures amounting to several atmospheres; second, a metal reflector 19; third, an objective constituted by a system of lenses 20; fourth, a series of incandescent electric lamps 21, arranged in the form of an annular crown around the principal reflector, so as to form an electric beacon of considerable illuminating power, (22 represents the reflectors for the lamps 21,) and, fifth, a mirror 23, Fig. 1, for the vertical transmission of the image.

24 is a sphere attached to the objective portion of the device and serves to collect within it the drops of water arising from sweating through the stuffing-boxes of the different elements.

25 indicates a support, and 15 is an air-bell carried by the objective portion of my device.

In its upper portion the submarine telescope is provided with, first, a main tube 1, connected to an air-compressor or gas-compressor provided with an exhaust-cock; second, a reflecting-mirror 26.

The eyepiece may be of different forms. It is constituted by, first, a system of lenses 27; second, a reflecting-mirror 28; third, a planoconvex lens 29, and, fourth, a crystal 30, inserted in a screw-threaded sleeve 31. This eyepiece is detachable by means of the flange 32 and may be replaced by any other objective of suitable form. Each system of lenses of the objective may be substituted by a double-convex lens.

The submarine telescope operates in the following manner: When it has been attached to the side of a floating object of any suitable kind, Fig. 1, by means of a flexible tube 9, it is placed in communication with a compressed-air or gas accumulator. The air or gas in entering the apparatus causes it to extend, owing to the pressure which it exerts upon the lower element, or, in other words, causes this latter to descend and to carry with it in succession the second, third, and other elements until the apparatus is completely extended. Obviously the pressure of the air or gas should invariably be greater than that of the pressure of the column of water beneath which the objective of the appliance is to be thrust. In addition this pressure should be sufficient to overcome the resistance offered by the stuffing-boxes and all other secondary resistances. As soon as the apparatus has been extended so as to attain the desired depth the current is switched onto the incandescent electric lamps, and horizontal or other exploring operations may be commenced immediately. In order to fix the tube—that is to say, to cause it to stop at the desired position—it is only necessary to stop the supply of air or gas under pressure, and in order to cause it to resume its initial position it is only necessary to close the cock, placing the flexible tube in communication with the compressor, and open the exhaust-cock 10. Owing to this discharge, the pressure of the water being no longer balanced by that of the gas will telescope the tubes one within the other. The apparatus may also be extended by means of a weight arranged beneath the sphere 24 and which should be sufficient to overcome the resistance of the pressure of the column of water and fixed or telescoped by means of cables or chains 13, attached to rings 14 and to the winch 12. When the apparatus has reached the desired depth and the electric lamps have been lighted, the image of objects at the bottom of the sea or other piece of water will be reflected upon the crystal 18, and from this latter the image will pass through the system of lenses 20 of the objective, being then reflected successively upon the surface of the suitably-inclined mirror 23, from which they are reflected upon the mirror 26 of the principal element and thence through the combined lenses 27 of the eyepiece, which transmit them to the last mirror 28, arranged directly beneath the lens 29 and the observation-crystal 30, and from this latter the observer is able to view all objects situated in the water or upon the bottom, and this for a radius proportionate to the diameter and sphericity of the combined lenses above mentioned, and it is of course possible to photograph the objects comprised in the same radius by attaching a photographic apparatus upon the junction-piece of the eyepiece. For this purpose it is only necessary to apply upon the crystal a pane of ground glass and then to proceed in the ordinary manner.

Obviously the submarine telescope must in all cases be perfectly water-tight, while the lenses and mirrors should be arranged in such a manner as to permit the gases to circulate freely through the apparatus, so as to render the pressure uniform. The electric reflector must also be perfectly water-tight and glazed in such a manner as to be capable of resisting great pressures.

When the desired observations have been made, the apparatus may be drawn in by discharging the gases or by proceeding in the manner already indicated—that is to say, by acting upon the cables 13 or injecting air or gases into the bell 15.

What I claim is—

1. A submarine telescope of the character described, comprising a water-tight tube 1, and concentric tubes 8 slidable in the tube 1, said concentric tubes being adapted to telescope one within the other and provided with detachable objectives and eyepieces of different forms, in combination with a buoyant body, means for supporting the tubes 1 and 8 from and exteriorly of the buoyant body in position to be adjusted so as to bring an objective to different depths in the water, an air-bell 15 carried by the innermost tube 8, a spherical vessel 24 at the lower end of said innermost tube 8, a winch carried by the tube 1 and a cable attached at one end to the winch and at the other end to the innermost tube 8.

2. A submarine telescope of the character described comprising a water-tight tube 1 and concentric tubes 8 slidable in the tube 1, said tubes 8 being adapted to telescope one within the other and provided with a detachable objective and an eyepiece, said objective comprising a reflector 19, a glass 18 carried by the reflector, a series of electric lamps 21 arranged in the form of a crown around the reflector, lenses 20 arranged in rear of the reflector, and a mirror 23 arranged in rear of the lenses 20, an air-bell 15 on the innermost tube 8, a spherical vessel 24 at the lower end of said innermost tube, a winch carried by tube 1 and a cable attached at one end to the winch and at the other end to the innermost tube 8.

In witness whereof I have hereunto set my signature in the presence of two witnesses.

GIUSEPPE PINO.

Witnesses:
G. B. ZANARDO.
ANGELO BORAZINO.